United States Patent [19]

Ferrara

[11] Patent Number: 5,695,577
[45] Date of Patent: Dec. 9, 1997

[54] RUBBER PATCH FOR REPAIRING RADIAL-PLY TIRES

[75] Inventor: Giuseppe Ferrara, Bari, Italy

[73] Assignee: R.F.P. S.r.L.(Ricostruzione Fascia Prestampata), Modugno, Italy

[21] Appl. No.: 743,284

[22] Filed: Nov. 4, 1996

Related U.S. Application Data

[63] Continuation of Ser. No. 87,071, Jul. 7, 1993, abandoned, which is a continuation of Ser. No. 579,245, Sep. 6, 1990, abandoned, which is a continuation of Ser. No. 274,185, Nov. 21, 1988, abandoned.

[51] Int. Cl.$^6$ .................................................. B29C 73/10
[52] U.S. Cl. ........................... 152/367; 156/97; 428/112
[58] Field of Search ................................ 152/367, 535, 152/538; 156/97, 96, 124, 137; 428/63, 109, 112, 114; 264/36

[56] References Cited

U.S. PATENT DOCUMENTS

| | | | |
|---|---|---|---|
| 1,426,672 | 8/1922 | Radford | 156/96 |
| 1,653,162 | 12/1927 | Forman | 152/367 |
| 2,838,087 | 6/1958 | Covert | 156/97 X |
| 3,133,585 | 5/1964 | Iknayan | |
| 3,260,296 | 7/1966 | Claxton | 152/367 |
| 3,464,477 | 9/1969 | Verdier | 152/367 |
| 3,973,612 | 8/1976 | Mezzanotte | 152/529 |
| 4,216,813 | 8/1980 | Kersker | 152/538 X |
| 4,285,382 | 8/1981 | DiRocco et al. | 152/367 |
| 4,333,508 | 6/1982 | DiRocco et al. | 152/367 |
| 4,399,854 | 8/1983 | DiRocco et al. | 152/367 |
| 4,408,649 | 10/1983 | Litterini | 152/367 |
| 4,617,976 | 10/1986 | Kawajiri | 152/209 R |
| 4,881,587 | 11/1989 | Kabe et al. | 152/538 X |

FOREIGN PATENT DOCUMENTS

| | | | |
|---|---|---|---|
| 291568 | 11/1988 | European Pat. Off. | 428/109 |
| 1548676 | 10/1968 | France . | |
| 2015190 | 4/1970 | France . | |
| 1201703 | 3/1960 | Germany | 152/367 |
| 1272605 | 5/1972 | United Kingdom | 152/367 |

*Primary Examiner*—Geoffrey L. Knable
*Attorney, Agent, or Firm*—Jacobson, Price, Holman & Stern, PLLC

[57] ABSTRACT

A method for the production of patch-rubbers intended to repair radial-ply and bias-ply tires. The patch-rubbers, although having the same strength as those known, are more flexible and do not affect the original mechanical features and performances of the regions of the tires repaired therewith, and are also suitable to perform retreading operations on tires by both high pressure molding machines and autoclaves. The method consists in superposing the plies ($1a$, $1b$), embedding a fabric made by fiber cords, in such a way that their medium axes diverge from the longitudinal or symmetry axes A of the patch-rubbers, and in superposing on the plies, a further ply (2) of smaller area having rectilinear metallic cords forming a different angle with the above mentioned axes A.

4 Claims, 2 Drawing Sheets

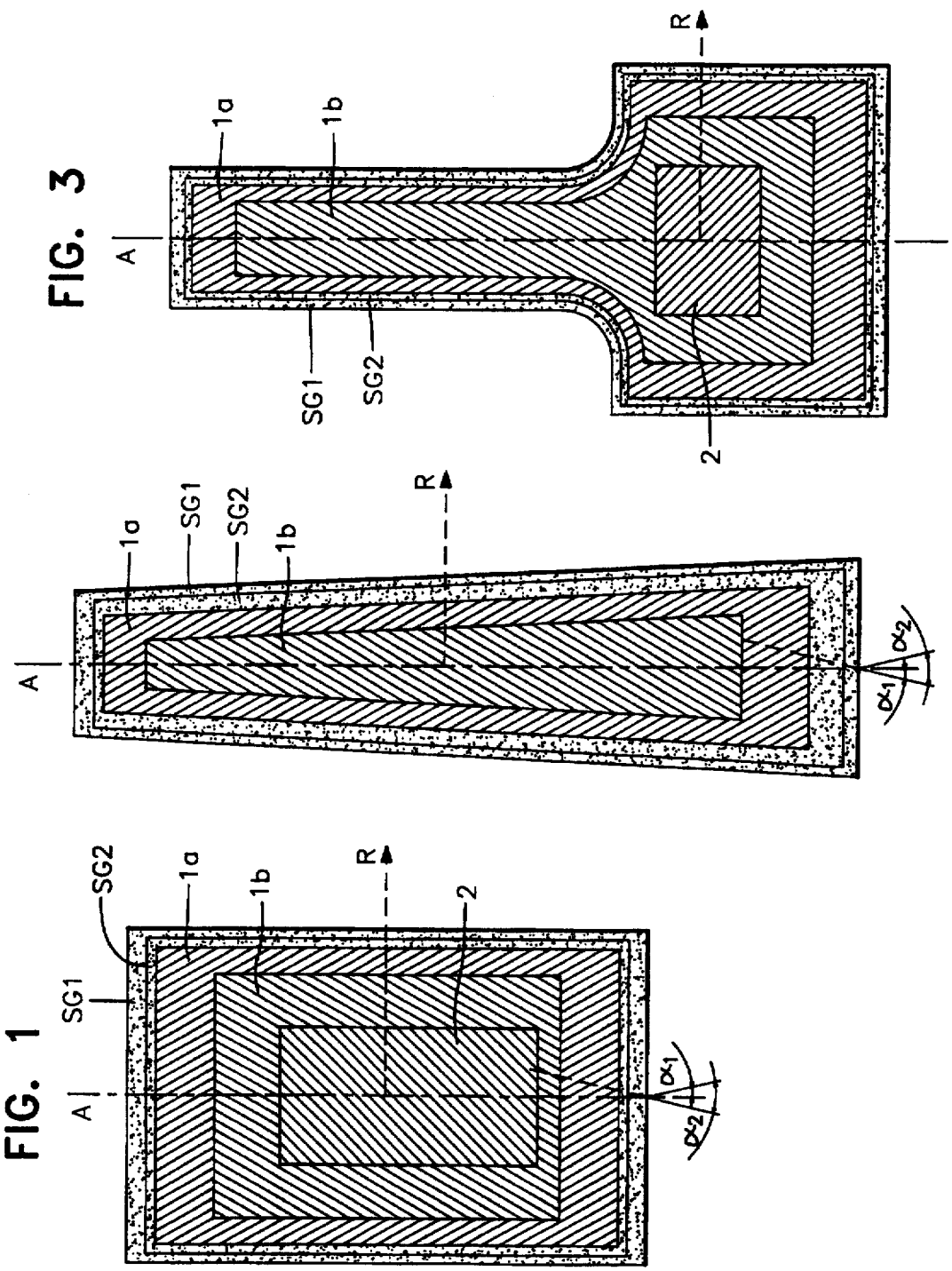

RUBBER PATCH FOR REPAIRING RADIAL-PLY TIRES

This application is a continuation of application Ser. No. 08/087,071, filed on Jul. 7, 1993, now abandoned, which is a continuation of Ser. No. 07/579,245, filed Sep. 6, 1990, now abandoned, which is continuation of Ser. No. 07/274,185, filed on Nov. 21, 1988, now abandoned.

The present invention relates to a method to improve the endurance and reliability of patch-rubbers for tires, and of tires, radial-ply tubeless or tube-type tires, repaired and or retreaded by means of the patch-rubbers produced according to the method.

The patch-rubbers produced nowadays and employed to repair tires to be retreaded or only to be repaired, comprise one or more layers of rubber coated cords, i.e. plies, which are made bonded to each other by means of a vulcanization process.

Such cords, usually made of a synthetic fiber and forming the fabric embedded in the plies, are conventionally arranged parallel to each other and to the longitudinal axis of each of the plies, whereby the cords, as a whole, are arranged parallel to the longitudinal axis i.e. to the largest dimension of the patch-rubbers.

The fact that the cords are so arranged to be all mutually parallel to each other, provides for some drawbacks both to the tires to be retreaded and to those which need only to be repaired therewith, in particular when patch-rubbers, comprising a plurality of such plies superposed to each other, are used to repair the tires, previously or not to a retreading thereof.

The following drawbacks are provoked by the unsuitable features of known patch-rubbers today:

1) Known patch-rubbers have too large a rigidity and do not withstand the mechanical stresses acting perpendicularly to their surface, because some of the cords, embedded therein, are stretched when the patch-rubber is bent in use.

In fact, when the patch-rubber is bent in use so as to assume a convex form, the cords, located on the same side of the patch-rubber where the convexity appears, are stretched; conversely, when the patch-rubber is bent in use the other way, the cords located on the opposite side thereof are stretched in turn.

This drawback becomes more and more noxious when the patch-rubber has been vulcanized onto the metallic body or carcass of a tire, specifically onto the sidewalls thereof, where the flexibility is greater, according to the fact that the metallic radial cords, forming the tire carcass, provide for a further rigidity and lower ability to withstand the compression stresses.

2) Known patch-rubbers show a very low ability to withstand mechanical stresses acting perpendicularly to the cords, and hence, specifically in radial-ply tires, to withstand mechanical stresses acting perpendicularly to the metallic radial cords forming the radial-ply carcass thereof.

On the other hand, in tires retreaded or only repaired, by means of present day conventional patch-rubbers, the following drawbacks have been found to arise:

1) an overheating of the regions to which the patch-rubbers have been bonded, on account of the increased rigidity and stiffening the so repaired tire shows in such regions and, consequently, an increased wear and a quicker ageing of the compound-batch forming the external surface of the tire in these regions;

2) the danger of a possible break-away of the patch-rubber from the repaired zone, on account of its rigidity, which does not allow the repaired zone to deform itself in the same way as the rest of the tire, or, at least, the danger of cracking or flow-over of the patch-rubber along its perimeter and of a consequent thinning of the rubber coated onto the extremities of the synthetic cords, which causes the air to infiltrate into the channels where the metallic cords of the tire carcass are contained which provokes both the disconnection of the metallic cords from the rubber into which they are embedded and the delamination of the patch-rubber itself.

The air which infiltrates into the channels containing the cords also causes the swelling thereof and overheating of the air when the tire is in use, which may also provoke a swelling or bulging of the external surface of the tire with the consequent explosion of the latter, the repaired zone having collapsed;

3) an increasing of the mechanical stresses to which the metallic radial cords of the tire casing are submitted, especially in the region corresponding to the transversal edges of the patch-rubber, on account of the higher stiffening of the region provoked by the patch-rubber itself;

4) a buckling and twisting of the internal surface or liner of the tire, after the vulcanization process has been performed, provoked by the excessive rigidity of the patch-rubber which is hence not susceptible to adapt itself to the deformations of the tire casing, especially in the sidewalls thereof.

This provokes an unbalance of the tire, when it is rolling in use, and produces abnormal pulsating mechanical stresses.

On the contrary, the reduction of the number of superposed plies, having parallel rectilinear cords embedded therein, in order to increase the flexibility of the patch-rubbers, is not always possible, because it results in a diminished strength of the patch-rubbers and provokes settling or collapsing of the repaired zone both during the retreading process and when the tire is in use.

BRIEF SUMMARY OF THE INVENTION

The primary object of the present invention is, first of all, to overcome the above mentioned drawbacks of the patch-rubbers caused by superposed plies whereby the cords, made of a synthetic fiber and embedded therein, are all parallel to each other and to the largest dimension of the plies, defining the direction of the longitudinal axis thereof, by providing patch-rubbers having a new structure and showing a high strength by means of a plurality of superposed layers or plies, whereby the new patch-rubbers are, at the same time, highly flexible and allow by their employment tires to be repaired or retreaded according to the best skill, even in high pressure molding machines used to repair and/or retread the tires.

Another important object of the invention, which is a consequence of the above mentioned one, is to provide patch-rubbers showing a degree of elasticity comparable, i.e. of the same order of magnitude, to the degree of flexibility shown by the tire carcass or casing and susceptible to adapt themselves to all the kinds of deformations, continuous, alternative and of flexion, to which the tire may be submitted both when its is in use and during the vulcanization process, i.e, such that the patch-rubbers will provide the repaired zones with the same mechanical features and performances shown by the uninjured regions of the tire itself.

The invention, as defined herein, solves the problem of increasing the flexibility of the patch-rubbers comprising a plurality of plies having cords made of a synthetic or natural fiber embedded therein the patch-rubbers being intended to be used for radial-ply tires, without diminishing the strength and the mechanical resistance thereof, when the same number of layers or plies, as presently conventional, is involved.

The invention also solves the problem, correlated with the above mentioned one, of providing the repaired zone with an endurance and a reliability comparable to those shown by the uninjured region of the repaired tire and, finally, it solves the problem of allowing the vulcanization process of the tires to be retreaded, to be effected not only in autoclaves, but also by means of high pressure molding machines, while avoiding the so handled tires being submitted to permanent deformations and without modifying, i.e. diminishing, the elasticity of the repaired zones thereof.

The advantages obtained by means of the present invention are seen essentially in the increased reliability and endurance of both the tires which need only to be repaired and those which are intended to be retreaded also.

The life of a tire, when in use, is, nowadays, about five years; hence, in order to be economically sound, the extensive use of the cheaper retread tires shall provide, in addition to safety guaranties, also for guaranties of reliability and endurance which are proportional and comparable to the increased reliability and endurance of new tires.

BRIEF DESCRIPTION OF THE DRAWINGS

The method according to the invention is described in detail hereafter, making reference to the figures on the appended drawings sheets, which show and illustrate some preferred embodiments of the method and some preferred embodiments and uses of the patch-rubbers accordingly produced, wherein:

FIG. 1 is a cross-sectional view which shows an implementation of the method to produce a patch-rubber intended to repair radial-ply tires which have been injured in areas corresponding to the internal region of the stabilizing belt;

FIG. 2 is a view similar to FIG. 1 which shows an implementation of the method to produce a patch-rubber intended to carry out overall restorations of radial-ply tires which have been injured in areas corresponding to the tread shoulder, of the sides and middle of the stabilizing belt, and of the tire sidewalls;

FIG. 3 is a view similar to FIG. 1 which shows an implementation of the method to produce a patch-rubber intended to repair radialply tires which have been injured in areas corresponding to the tread shoulder;

DETAILED DESCRIPTION

Figure 4:
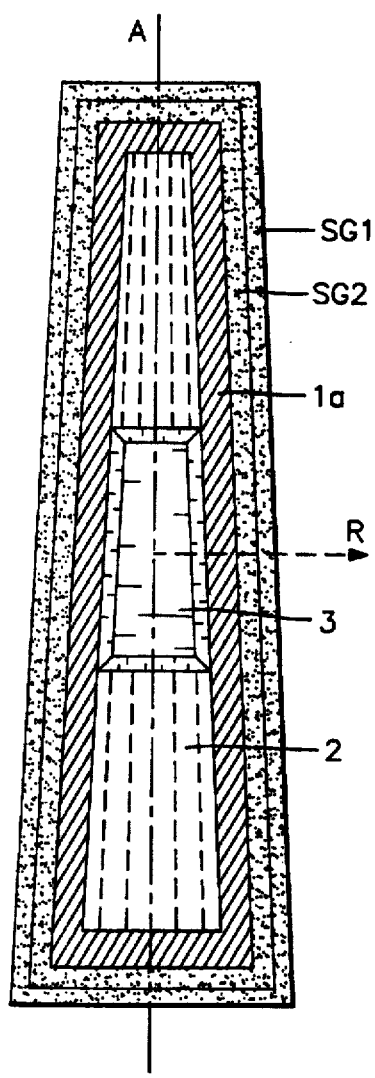
FIG. 4 is a view similar to FIG. 2 which shows an implementation of the method to produce a trapezoidally shaped patch-rubber, comprising metallic cords embedded in a ply thereof and a rubber dowel, intended to repair injuried sidewalls of radial-ply tires.

As will be evident from the drawings, the method according to the invention comprises, essentially and first of all, the step of arranging, within each of the superposed layers or plies 1a and 1b, the rectilinear cords, made of a synthetic fiber and constituting the fabrics embedded in each of the plies respectively, parallel to each other and to a common direction, whereby the common direction is inclined relative to the longitudinal axis A of each layer or ply, i.e. relative to the largest dimension thereof, which, in a radial-ply tire, is always orthogonal to the rolling direction R of the tire, so as to form with said longitudinal axis A an angle greater then 0°.

The method comprises further the step of superposing two such plies 1a and 1b in such a way that their respective longitudinal axes A lay in coincidence with the longitudinal axis A of the whole patch-rubber, whereby two of said plies, directly superposed to each other, are so positioned that their respective cords form the angle with the longitudinal axis A of the whole patch-rubber, alternatively in the clockwise and in the counterclockwise direction.

When injuries into the sidewalls of radial-ply tires have to be repaired, the method comprises the further step of positioning the patch-rubber, on the injured region of the tire sidewall, in such a way that the direction of the patch-rubber longitudinal axis A lays superposed to the radial direction of the metallic cords embedded in the tire sidewalls, i.e. lays superposed to the direction of that metallic radial cord which lays in the middle of the injured region.

As a consequence thereof the cords, embedded in each of the superposed plies 1a and 1b constituting the patch-rubber, are alternatively angularly inclined relative to said radial direction.

The angular inclination of the cords embedded in each ply, relative to the longitudinal axis A of the patch-rubber, is represented by a variable angle $\alpha 1$, greater than 0°, but preferably not exceeding 20°.

The number of plies, having the inclined cords embedded therein, which are superposed to form a patch-rubber, may vary e.g. up to eight; the number may however be reduced to one, when no very high strength of the patch-rubber is required.

In some peculiar cases, when it is desired to provide for a patch-rubber having an higher rigidity, the patch-rubber according to the method may be produced by superposing, in direct contact to each other, a first group of two or more plies in which the cords, which constitute the fabrics therein embedded, are all inclined in the same direction, e.g. clockwise, and so to form the same angle included between 0° and 20° relative to their common longitudinal axis A, and a second group of two or more plies, superposed to said first group, whereby the cords, embedded in the two or more plies of said second group, are likely arranged as those of the first group, but so inclined, e.g. in the counterclockwise direction, as to form the same angle as above with their common longitudinal axis A, but on the opposite side thereof.

Figure 5:
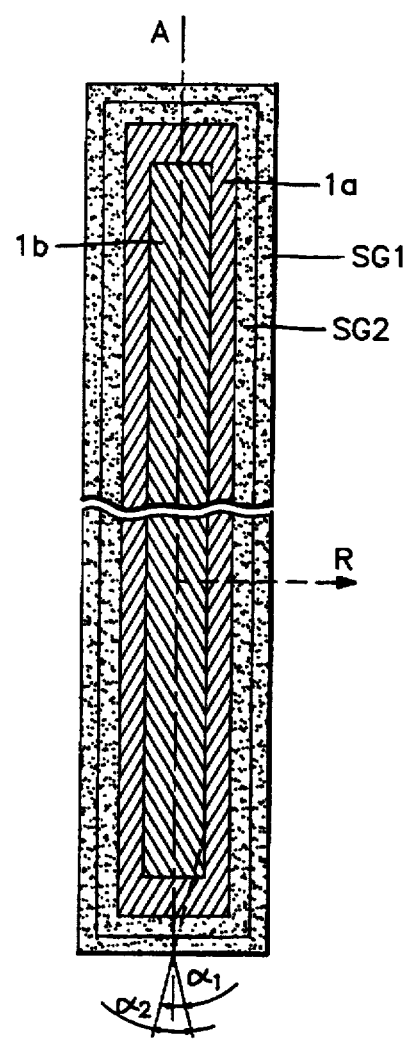
FIG. 5 is a view similar to FIG. 4 which shows an implementation of the method to produce a patch-rubber intended to repair bulges in the sidewalls of radial-ply tires.

The angle $\alpha 2$ (FIGS. 1, 2 and 5) is that formed with each other by the common directions of the cords embedded into plies 1a and 1b respectively.

The patch-rubbers produced according to the various implementations of the inventive method show, superposed to the plies 1a and 1b, rubber layers $SG_1$ and $SG_2$ having the function of ensuring the tightening of the repaired zones.

Another important feature of the invention consists in providing the patch-rubbers produced according to the inventive method to be used in repairing heavy injuries as cuts, holes or tears in the sidewalls or in the tread, (see FIGS. 1, 3, 4) of radial-ply tires, of a further ply 2, having embedded therein rectilinear metallic cords arranged parallel to each other and inclined relative to the above mentioned longitudinal axis A.

When the patch-rubbers are intended to repair injuries in the tires sidewalls, as the trapezoidally shaped patch-rubber illustrated on FIG. 4, the metallic cords, embedded in the further layer or ply 2, are radially arranged, i.e. so as to converge towards a center point, like those embedded in the sidewalls of the radial-ply tire to be repaired.

When the patch-rubbers, are intended to repair injuries in the stabilizing belt, the metallic cords, embedded in the further ply 2, are arranged similarly to those embedded in the stabilizing belt, i.e. in such a way as to form, with the symmetry axis A, an angle complementary of that, varying between 15° and 30°, formed by the cords embedded into the stabilizing belt with the rolling direction R (see FIGS. 1 and 3).

The patch-rubbers produced according to the present inventive method, provide advantageously also for a very strong bonding of the further layer or ply 2, having rectilinear metallic cords embedded therein, sandwiched between the plies 1a, 1b and the tire casing.

It is obvious that the implementation of the method according to the invention is in no way effected or modified if cords made of a natural fiber are used instead of cords made of a synthetic fiber and if the accordingly produced patch-rubber assume geometrical forms different from those specifically disclosed in the present application.

It is further pointed out that the overall area of the ply 2, having rectilinear metallic cords embedded therein, is smaller than the area of the plies 1a and 1b to which it is superposed, thereby providing for an increased endurance and reliability of the regions of the tires where an injury has been repaired, and that the large overall area of plies 1a and 1b provides for a gradual progressive decreasing of the stiffening of the repaired zone, in the direction towards the external edges of plies 1a and 1b.

During the vulcanization process, the patch-rubbers produced according to the implementations of the inventive method, do not provide for any permanent deformation of the therewith repaired zones, as it happens with the present day usual patch-rubbers which show a too high rigidity.

The patch-rubbers according to the implementations of the inventive method allow, moreover, the repaired tire to deform itself easily, when in use, in particular during the flat rolling of the tread due to overload or to a lowering of the inside air pressure; this also when the rolling tire encounters extraneous bodies, e.g. stones or other impediments, which provoke the tread itself to be sharply inflected towards the inside of the tire.

The same easy and flexion deformations, in use, on account of the various flexion stresses which may be applied thereto, are also allowed in the sidewalls of the repaired tires.

The disclosed patch-rubbers may also be supplied with cements and adhesive rubber layers, known per se, which are vulcanizable both at a low and at a high temperature or even self-vulcanizing.

The main steps which implement the method according to the invention, may be summarized as follows:

1) mutual superposition of plies 1a and 1b, whereby the cords, made of a fiber and embedded therein, are rectilinear and equally inclined relative to the longitudinal axis A of the ply to which they belong; the plies 1a and 1b, when two or more thereof are superposed, being so positioned, relative to each other, that the cords are alternatively inclined in the clockwise and in the counterclockwise direction, relative to the longitudinal axis A of the resulting patch-rubber;

2) superposition, to the above mentioned layers or plies 1a and 1b, of a further ply 2, having rectilinear metallic cords embedded therein; further ply 2 being so positioned that the rectilinear metallic cords form an angle between 15° and 30° with respect to the rolling direction R (FIGS. 1 and 3).

Figure 6:
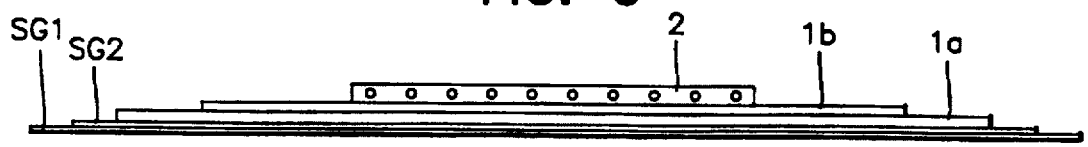
FIG. 6 is a cross-sectional view taken along line X—X of FIGS. 1 and 3, that illustrates the usual position of the plies in the patch-rubbers implementing the method.

3) superposition, on the patch-rubber side, opposed to further ply 2 or in the alternative on the ply 2 itself (FIG. 6), of rubber layers $SG_1$ and $SG_2$ having a higher elasticity and a larger area than the plies mentioned in preceding point 1) to ensure both the smoothing of the repaired surface and the tightening thereof;

4) vulcanization of the assembly comprising the layers $SG_1$ and $SG_2$ the plies 1a, 1b and 2, by means of the most suitable vulcanization process to ensure that, after the vulcanization process, the assembly results in a single body. The patch-rubbers resulting from the implementation of the method according to the invention may assume geometrical forms other than those specifically disclosed.

It is pointed out that, in the present disclosure, the expression "ply" is intended to mean a layer of rubber coated cords, while by "rubber layer" it is intended a layer of rubber having no cords embedded therein.

The method applies also to improve the endurance and the reliability of patch-rubbers for bias-ply tires.

I claim:

1. A rubber patch for repairing radial-ply tires, said patch comprising:

at least two superposed cord plies formed by rubber-coated fabrics of cords made of synthetic or natural fibers, the cords of each ply being mutually parallel and rectilinear, a longitudinal axis of each ply being superposed on a longitudinal axis of the patch, and an additional ply having metallic cords embedded in rubber, the cords of the at least two superposed plies form, in turn with the longitudinal axis of the patch, an angle greater than 0° and less than 20° in a clockwise direction in one of the plies and in a counter-clockwise direction in the other superposed ply, wherein when the patch is applied in such a way that the longitudinal axis is parallel to, or superposed on, the radial cords of a tire, the metallic cords of the additional ply are oriented either as the cords radially arranged in the sidewalls of the tire when the patch is to be applied on the sidewalls of the tire or as the parallel cords diagonally arranged in the tire belt when the patch is to be applied in an area of the tire belt or in an area of two corners that the tire belt forms with the sidewalls.

2. A rubber patch for repairing radial-ply tires as claimed in claim 1, wherein the patch is rectangular-shaped to repair damage to the tire belt.

3. A rubber patch for repairing radial-ply tires as claimed in claim 1, wherein the patch is a trapezoid shape to repair damage to the tire sidewall.

4. A rubber patch for repairing radial-ply tires as claimed in claim 1, wherein the plies are assembled by vulcanization.

* * * * *